Patented Aug. 29, 1950

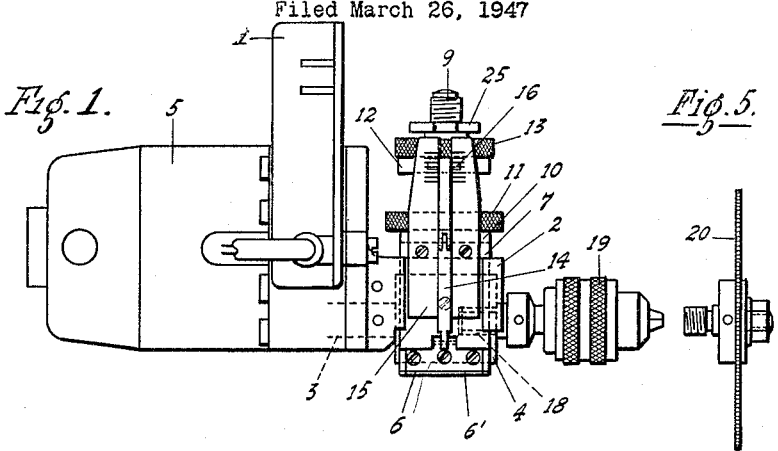
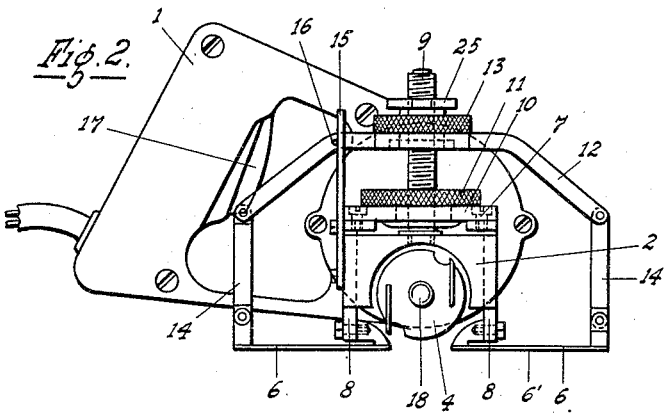
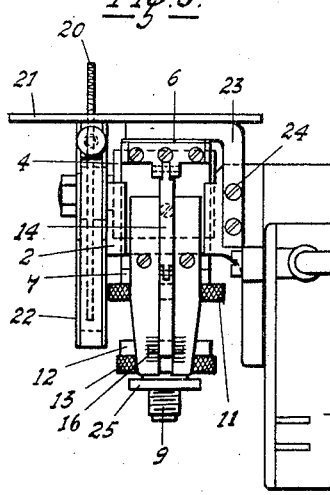
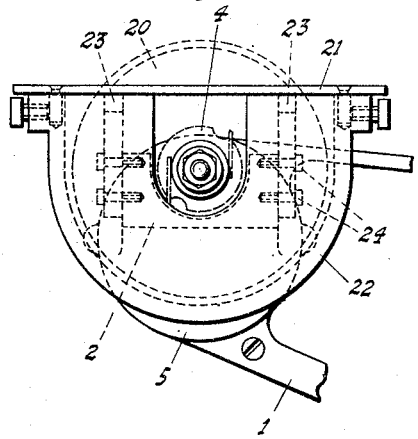

2,520,875

UNITED STATES PATENT OFFICE 2,520,875

FLEXIBLE FACE HAND PLANING MACHINE

Fritz Birchmeier, Zurich, Switzerland, assignor to Max Schneider, Zurich, Georges Baur, Aargau, and Ernest Imfeld, Zurich, Switzerland Application March 26, 1947, Serial No. 737,227
In Switzerland April 6, 1946

2 Claims. (Cl. 144—117)

The present invention refers to a hand planing machine which is suitable for joiners, woodworkers, coachmakers, coopers and the like, and which may be adapted for use also as a drilling machine or a circular saw.

By way of example one form of the machine is shown on the accompanying drawing, on which—

Fig. 1 is a rear view of a machine adapted for use as a drilling machine;

Fig. 2 is a side view of the machine;

Fig. 3 is a side view of the machine adapted for use as a circular saw;

Fig. 4 is a view at right angles to Fig. 3; and

Fig. 5 shows a circular saw blade with holding clamp.

The illustrated hand planing machine comprises a cutter head 4 riding on a shaft 3 of an electric motor 5 in a housing 2. This housing is provided with a handle 1. The shaft 3 is directly coupled to the electric motor 5. Before and behind the cutter head 4, in the direction of its rotation, there are bearing surfaces 6' formed by two leaf springs 6, 6 which are attached at their one ends to the ends of the two arms 8, 8, of a U-shaped yoke 7, which arms are bent rectangularly inwards. These arms terminate before and behind the vertical longitudinal centre plane of the cutter head 4 so as to leave a suitable gap between them. The arms 8 of the yoke 7 are arranged to slide up and down in the casing 2 upon movement of the nut 11 on the fixed, vertical spindle 9. The housing 2 is equipped with a spindle or central support 9 working in a nut 11 rotatably mounted in the crosshead 10 of the yoke 7 as well as in a further nut 13 carried by a second yoke 12. The yoke 12 is fitted over the yoke 7 on the spindle 9. The ends of the arms of the yoke 12 are connected to hinged fingers 14 the lower ends of which are hinged to the outer ends of the leaf springs 6, 6. A pointer 16 on the yoke 12 adjacent a scale 15 carried by the lower yoke 7 enables the depth of cut to be set or determined as the scale 15 moves up or down behind the pointer upon adjustment of the lower yoke. 17 is an electrical press-button switch on the handle 1 for controlling the electric motor. The cutter head 4 contains a tapped bore 18 to accommodate a drilling chuck 19 (Fig. 1) or a circular saw blade 20 (Fig. 5).

When the nut 11 is rotated in either direction the housing 2 with the cutter head 4 is moved upwards or downwards in the U-shaped yoke 7 thus causing the cutter head 4 to move nearer to or farther from the bearing surfaces 6', 6' thus regulating the depth of cut.

By rotating the nut 13 the upper yoke 12 can be adjusted in height upward or downward, the motion being transmitted by the fingers 14, to the leaf springs 6, 6. In this manner the bearing surfaces 6', 6' can be adjusted either to lie in the same plane or to be drawn up at their outer ends in order to vary the curvature of the bearing surfaces and enable cutting to be done on hollow or recessed surfaces of the work.

The bearing surfaces 6', 6' are adjustable independently of the regulation of the cutting depth of the cutter head 4 since the two nuts 13 and 11 are separately rotatable by hand on their common spindle 9. 25 is a locking nut.

To adapt the planing machine described above for use as a drilling machine it is only necessary to screw the drilling chuck 19 on to the cutter head as shown in Fig. 1.

For use as a circular saw the saw blade 20 shown in Fig. 5 is screwed on to the cutter head 4, and the platen 21 provided with a shield 22 for the saw blade is attached to the housing 2 in accordance with Figs. 3 and 4. For ease and rapidity of attaching and removing the platen the latter is provided with angle lugs 23 by which it can be screwed on to the housing 2 by means of screws 24. The platen is slotted to admit the saw blade. As will be seen from Figs. 3 and 4 the machine is turned through 180° from the position shown in Fig. 1. In this position it can be clamped in a vise by the handle 1 leaving the operator's hands free for guiding the work on the platen 21. Alternatively for sawing by hand the machine can be moved over the work while resting on its platen.

Instead of coupling the cutter head directly to the electric motor 5 it may be connected to any stationary electric motor by a flexible shaft. In such case the cutter head is carried in a self-contained housing to which the handle is fixed.

I claim:

1. In a planing machine having a cutter head and flexible bearing surfaces disposed adjacent the cutter head on opposite sides thereof, the improvement comprising: a spindle secured at one end to the cutter head, and two yokes spaced apart above the cutter head, traversed by said spindle and carrying means for independently moving each one therealong, one yoke spanning the inner ends of said bearing surfaces and being connected thereto, and the other yoke spanning the outer ends of said bearing surfaces and being connected thereto, whereby by movement of said other yoke along the spindle the curvature of said bearing surfaces may be adjusted, and by movement of the spindle in relation to said first yoke the displacement of the cutting head to and from the bearing surfaces may be effected.

2. In a planing machine having a cutter head, a housing therefor, and flexible bearing surfaces carried by the housing and disposed adjacent the cutter head on opposite sides thereof, the improvement comprising: a threaded spindle centrally traversing said housing and secured at one end to said cutter head therein, a bendable yoke spaced apart from said housing, centrally traversed by the spindle and having its opposite ends connected to the bearing surfaces, a nut rotatably mounted on said spindle in abutment with said yoke so as to cause the yoke simultaneously and equally to flex the opposing bearing surfaces upon joint axial movement of the nut and yoke along the spindle, and another nut rotatably mounted on the spindle in abutment with said housing whereby axial movement of said last nut positions the cutter head toward and away from the bearing surfaces.

FRITZ BIRCHMEIER.

REFERENCES CITED

The following references are of record in the file of this patent:

UNITED STATES PATENTS

| Number | Name | Date |
|---|---|---|
| 242,740 | Bailey | June 14, 1881 |
| 1,281,207 | Richens | Oct. 8, 1918 |
| 1,283,736 | Graham | Nov. 5, 1918 |
| 1,296,910 | Bloodgood | Mar. 11, 1919 |
| 1,457,492 | Bloodgood | June 5, 1923 |
| 1,663,486 | Wertz | Mar. 20, 1928 |
| 1,727,383 | Simonides | Sept. 10, 1929 |